(12) United States Patent
Tanigaki et al.

(10) Patent No.: US 9,505,387 B2
(45) Date of Patent: Nov. 29, 2016

(54) WIRING STRUCTURE OF A PARKING BRAKE CABLE

(71) Applicant: Nissan Motor Co., Ltd., Yokohama-shi, Kanagawa (JP)

(72) Inventors: Tatsunori Tanigaki, Yamato (JP); Nobuhiro Mori, Odawara (JP); Daisuke Yamamoto, Zama (JP); Ryo Saitou, Isehara (JP); Minoru Kaho, Ashigarakami (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/417,806

(22) PCT Filed: Sep. 3, 2013

(86) PCT No.: PCT/JP2013/073695
§ 371 (c)(1),
(2) Date: Jan. 28, 2015

(87) PCT Pub. No.: WO2014/045869
PCT Pub. Date: Mar. 27, 2014

(65) Prior Publication Data
US 2015/0251642 A1    Sep. 10, 2015

(30) Foreign Application Priority Data
Sep. 18, 2012  (JP) ................................. 2012-204195

(51) Int. Cl.
*B60T 11/04* (2006.01)
*B60T 7/04* (2006.01)
*B60K 20/04* (2006.01)

(52) U.S. Cl.
CPC .............. *B60T 11/046* (2013.01); *B60K 20/04* (2013.01); *B60T 7/045* (2013.01)

(58) Field of Classification Search
CPC .. F16D 125/60; F16D 125/62; F16D 125/64; F16C 1/10
See application file for complete search history.

(56) References Cited

U.S. PATENT DOCUMENTS

| | | | | |
|---|---|---|---|---|
| 2,853,144 A | * | 9/1958 | Mench | ...................... B60T 7/04 180/315 |
| 3,177,033 A | * | 4/1965 | Daniels | ................ B60N 2/4686 16/297 |
| 4,412,458 A | * | 11/1983 | Derringer | ............... B60T 11/06 74/502.4 |
| 4,454,936 A | * | 6/1984 | Wise | ...................... B60T 11/103 192/219.7 |

(Continued)

FOREIGN PATENT DOCUMENTS

| | | |
|---|---|---|
| CN | 201080181 Y | 7/2008 |
| CN | 201784606 U | 4/2011 |

(Continued)

*Primary Examiner* — Thomas J Williams
*Assistant Examiner* — James Hsiao
(74) *Attorney, Agent, or Firm* — Global IP Counselors, LLP

(57) ABSTRACT

A wiring structure includes brake cable, a shift selection device, and a support bracket. The brake cable links a foot-operated operation pedal disposed in front of a seat and brake units provided to rear wheels rearward of the seat and is directed toward a top surface of a floor tunnel in front of the seat in the vehicle. The shift selection device outputs a signal for switching a driving range position and is supported by the support bracket in a position to the side of the seat, so as to allow a cable insertion space to be disposed between the shift selection device and the top surface of the floor tunnel. The brake cable is wired so as to pass through the cable insertion space.

17 Claims, 7 Drawing Sheets

(56) References Cited

U.S. PATENT DOCUMENTS

| | | | | |
|---|---|---|---|---|
| 4,548,093 A * | 10/1985 | Nomura | B60T 11/046 180/315 |
| 4,716,781 A * | 1/1988 | Dussault | B60T 11/046 188/2 D |
| 4,790,205 A * | 12/1988 | Stocker | B60K 26/02 74/500.5 |
| 4,818,008 A * | 4/1989 | Cressoni | B60R 7/04 296/37.8 |
| 4,864,886 A * | 9/1989 | Burgei | B60R 7/04 180/315 |
| 5,054,333 A * | 10/1991 | Scott | G05G 5/05 74/512 |
| 5,106,143 A * | 4/1992 | Soeters | B60N 2/46 248/222.51 |
| 5,315,893 A * | 5/1994 | Behrens | B60T 7/02 74/512 |
| 5,957,526 A * | 9/1999 | Gramer | B60K 20/04 296/204 |
| 5,970,814 A * | 10/1999 | Smith | B60K 20/04 224/539 |
| 6,267,217 B1 * | 7/2001 | Malone | B60K 20/04 192/218 |
| 6,305,238 B1 * | 10/2001 | Gabas | B60T 11/04 403/13 |
| 7,028,574 B1 * | 4/2006 | Bell | B60K 20/04 180/315 |
| 7,874,603 B2 * | 1/2011 | Stoner | B60K 20/04 296/24.34 |
| 2007/0209903 A1 | 9/2007 | Hayashi et al. | |

FOREIGN PATENT DOCUMENTS

| | | |
|---|---|---|
| DE | 9002840 U1 | 5/1990 |
| FR | 2644115 A1 | 9/1990 |
| FR | 2895957 A1 | 7/2007 |
| JP | 1993-76931 U | 10/1993 |
| JP | 2000-168516 A | 6/2000 |
| JP | 2002-337629 A | 11/2002 |
| JP | 2009-12689 A | 1/2009 |
| WO | 2014/045784 A1 | 3/2014 |

* cited by examiner

WIRING STRUCTURE OF A PARKING BRAKE CABLE

CROSS-REFERENCE TO RELATED APPLICATIONS

This application is a U.S. National stage application of International Application No. PCT/JP2013/073695, filed Sep. 3, 2013, which claims priority to Patent Application 2012-204195 filed in Japan on Sep. 18, 2012, the contents of each of which are hereby incorporated herein by reference.

BACKGROUND

Field of the Invention

The present invention relates to a wiring structure of a parking brake cable extending rearward in a vehicle from a foot-operated operation pedal provided in front of a seat, and linked to a parking brake unit provided to a vehicle wheel rearward of the seat.

Background Information

Known in the art is a wiring structure of a parking brake cable in which a parking brake cable (referred to below as a "brake cable") is wired to a floor panel, the brake cable linking a foot-operated operation pedal disposed in front of a driver seat and a parking brake unit disposed on a rear wheel (for example, see Japanese Utility Model Application No. 5-76931). At this time, the brake cable extending from the operation pedal is wired toward the rear of the vehicle along a top surface of a floor tunnel formed in the vehicle-widthwise middle of the floor panel.

SUMMARY

However, in a conventional wiring structure of a parking brake cable, the brake cable is wired so as to creep up the side surface of the floor tunnel via the foot-operated operation pedal provided in front of the driver seat, and reach the top surface of the floor tunnel. To avoid interference with the driver seat when this occurs, the brake cable must creep up the side surface of the floor tunnel in a position farther forward in the vehicle than the driver seat. When the brake cable is bent, the bend R must be as large as possible, and the brake cable must therefore be wired so as to creep up the side surface of the floor tunnel in a position as far as possible from the operation pedal. In other words, the brake cable creeps up the side wall of the floor tunnel directly in front of the driver seat, and reaches the top surface of the floor tunnel.

However, in cases in which a shift selection device is set in a position on the top surface of the floor tunnel and to the side of the seat, a problem arises in that the brake cable interferes with the shift selection device after having crept up the side wall of the floor tunnel and reaches the top surface of the floor tunnel in a position directly in front of the driver seat.

The present invention was devised in view of the problems described above, it being an object of the invention to provide a wiring structure of a parking brake cable whereby interference can be prevented between a brake cable wired over a floor tunnel from a front side of a seat toward the rear of the vehicle, and a shift selection device set in a position on the floor tunnel and to the side of the seat.

To achieve the purpose described above, the wiring structure of a parking brake cable of the present invention comprises a brake cable, a shift selection device, and a device support means or structure.

The brake cable links a foot-operated operation pedal disposed in front of a driver seat, and a parking brake unit disposed on a vehicle wheel rearward of the driver seat.

The shift selection device, which is operated by a driver, outputs a signal for switching a driving range position.

The device support structure supports the shift selection device at a position to the side of the driver seat, so as to allow a cable insertion space between the shift selection device and the top surface of the floor tunnel.

The brake cable is directed toward the top surface of the floor tunnel farther forward in the vehicle than the driver seat, and is wired so as to pass through the cable insertion space.

In the wiring structure of a parking brake cable of the present invention, the shift selection device is supported by the device support structure so as to allow a cable insertion space between the shift selection device and the top surface of the floor tunnel in a position to the side of the driver seat. The brake cable is directed toward the top surface of the floor tunnel farther forward in the vehicle than the driver seat, and is wired so as to pass through the cable insertion space. Specifically, the brake cable passes below the shift selection device supported on the device support structure, on the top surface of the floor tunnel.

Therefore, when the brake cable extending from the foot-operated operation pedal disposed in front of the driver seat is wired toward the top surface of the floor tunnel farther forward in the vehicle than the driver seat, the brake cable does not interfere with the shift selection device supported at a position to the side of the driver seat.

As a result, it is possible to prevent interference between the brake cable wired over the floor tunnel from the front side of the driver seat toward the rear of the vehicle, and the shift selection device set in a position to the side of the seat on the floor tunnel.

BRIEF DESCRIPTION OF THE DRAWINGS

Referring now to the attached drawings which form a part of this original disclosure.

DETAILED DESCRIPTION OF EMBODIMENTS

Figure 1:
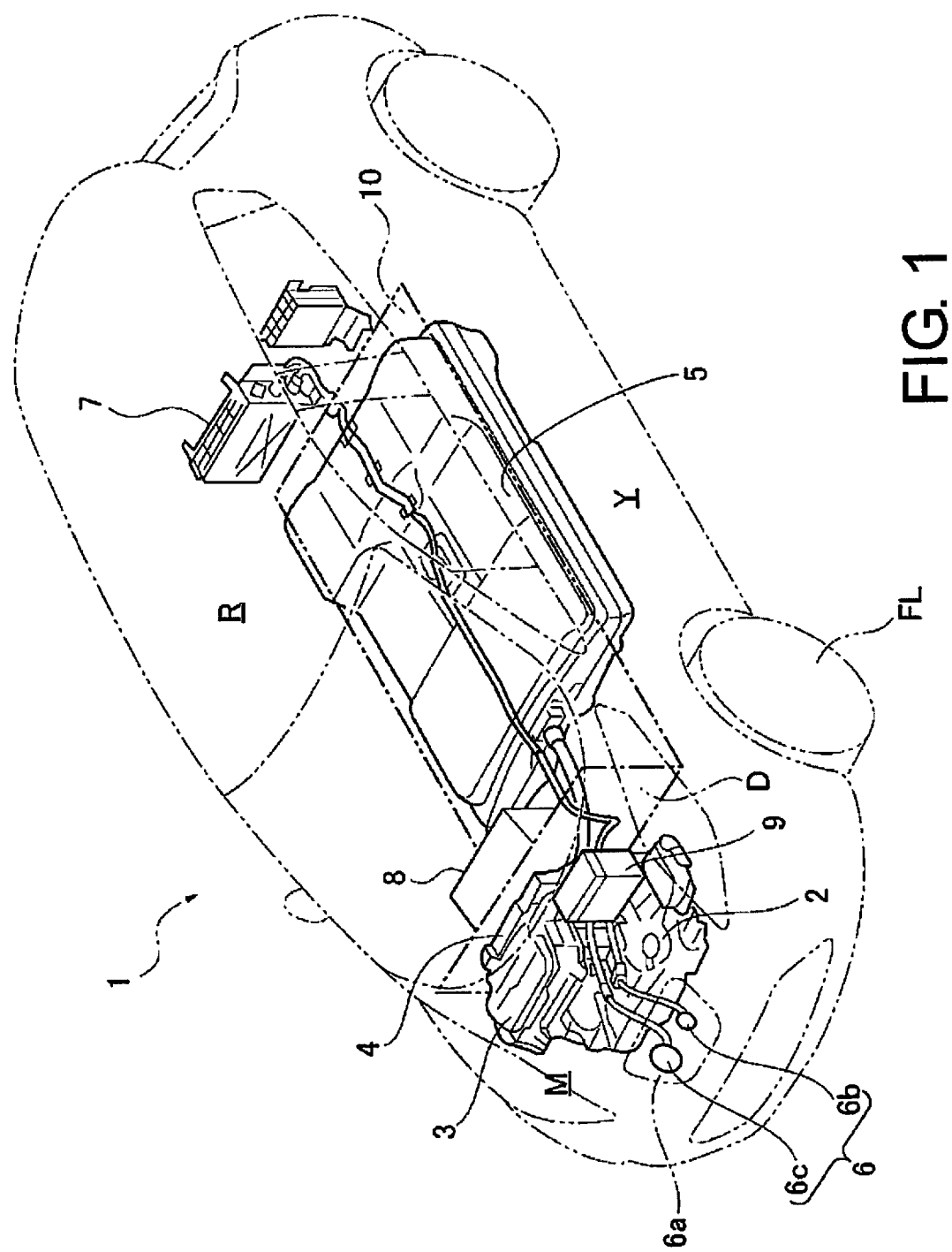
FIG. 1 is an overall perspective view showing the main configuration of an electric automobile to which the cable wiring structure of Embodiment 1 is applied.

Preferred embodiments of the wiring structure of a parking brake cable of the present invention are described below on the basis of Embodiment 1 shown in the drawings.

Embodiment 1

The configuration of the wiring structure of a parking brake cable of Embodiment 1 is divided into "Overall configuration of electric automobile," "Equipped configuration of electric automobile," "Configuration of parking brake mechanism," "Configuration of shift selection mechanism," "Configuration of airbag sensor mechanism," and "Wiring configuration of brake cable."

Overall Configuration of Electric Automobile

FIG. 1 is an overall perspective view showing the main configuration of an electric automobile to which the cable wiring structure of Embodiment 1 is applied. The overall configuration of the electric automobile of Embodiment 1 is described below with reference to FIG. 1.

The electric automobile 1 of Embodiment 1 comprises a drive motor 2, a drive motor inverter 3, a DC/DC junction box 4, a battery pack 5, a charging port 6, an onboard charger 7, and an air-conditioning unit 8, as shown in FIG. 1. The component shown by the symbol 9 in FIG. 1 is a 12-volt onboard battery.

The drive motor 2 is a travel drive source for the electric automobile 1, and is disposed in a motor compartment M disposed in the front part of the vehicle. An output shaft (not shown) of the drive motor 2 is linked to left and right front wheels FL (the other is not shown), which are drive wheels. When a positive torque command is outputted to the drive motor inverter 3, the drive motor 2 uses discharged electric power from the battery pack 5 to perform a drive action that generates drive torque, driving (powering) the left and right front wheels FL (the other is not shown). When a negative torque command is outputted to the drive motor inverter 3, the drive motor performs a power generating action of converting the rotational energy from the left and right front wheels FL (the other is not shown) to electrical energy, and the battery pack 5 is charged with the generated power (regeneration).

The DC/DC junction box 4 houses a DC/DC converter, dispenses high-voltage discharged power from the battery pack 5, supplies power to a 12-volt power source system, and charges the 12-volt onboard battery 9. The DC/DC junction box 4, which has a regular-speed charging relay and a high-speed charging relay, is designed to be capable of switching a charging circuit in accordance with a charging mode.

The battery pack 5 is disposed in an underfloor space Y on the underside of a floor panel 10 sectioning a passenger compartment space R and the underfloor space Y, the space being positioned in the middle of the wheel base. This battery pack 5 is the power source for the drive motor 2 as well as the power source for a PTC heater (not shown) housed in the air-conditioning unit 8.

The charging port 6 is disposed in a location, midway in the front of the vehicle, where a charging connector connected to an external power source such as a charging stand or home charging equipment is connected, and is covered in an openable and closeable manner by a port lid 6a. The charging port 6 has a regular charging port 6b and a high-speed charging port 6c. The regular charging port 6b is a charging port used during charging by home charging equipment, a regular charging stand, or the like, and is connected to the DC/DC junction box 4 via the onboard charger 7. The high-speed charging port 6c is a charging port used during charging by a high-speed charging stand, and is directly connected to the DC/DC junction box 4.

The air-conditioning unit 8 is disposed on the top side of the floor panel 10, i.e. in the passenger compartment R, farther toward the front of the vehicle than the battery pack 5. A dashboard panel D sectioning the motor compartment M and the passenger compartment R is disposed between installment panels (not shown). The air-conditioning unit 8 blows conditioned air into the passenger compartment R.

Equipped Configuration of Electric Automobile

Figure 2A:
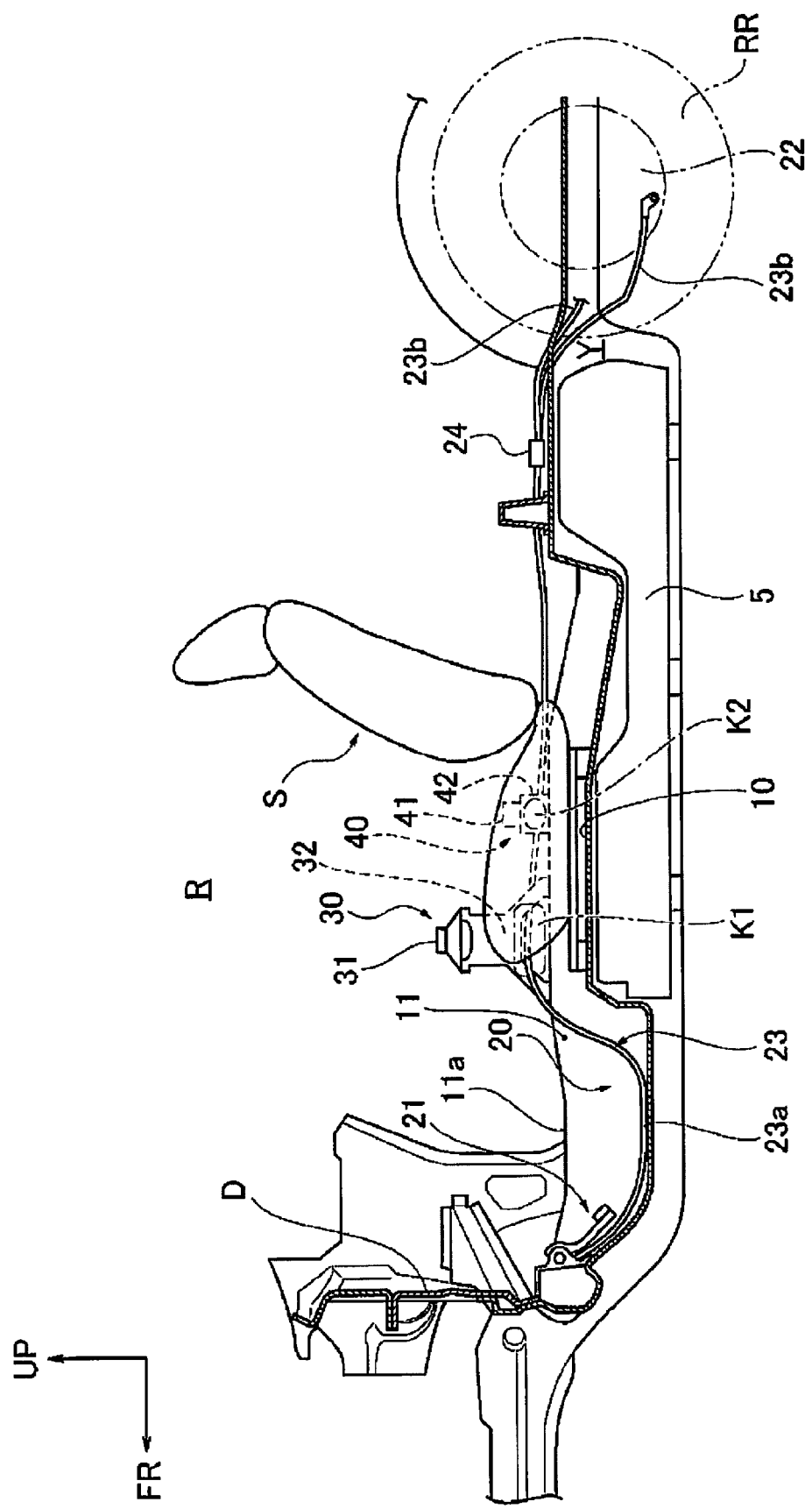
FIG. 2A is a schematic overall side view showing the electric automobile of Embodiment 1.
Figure 2B:
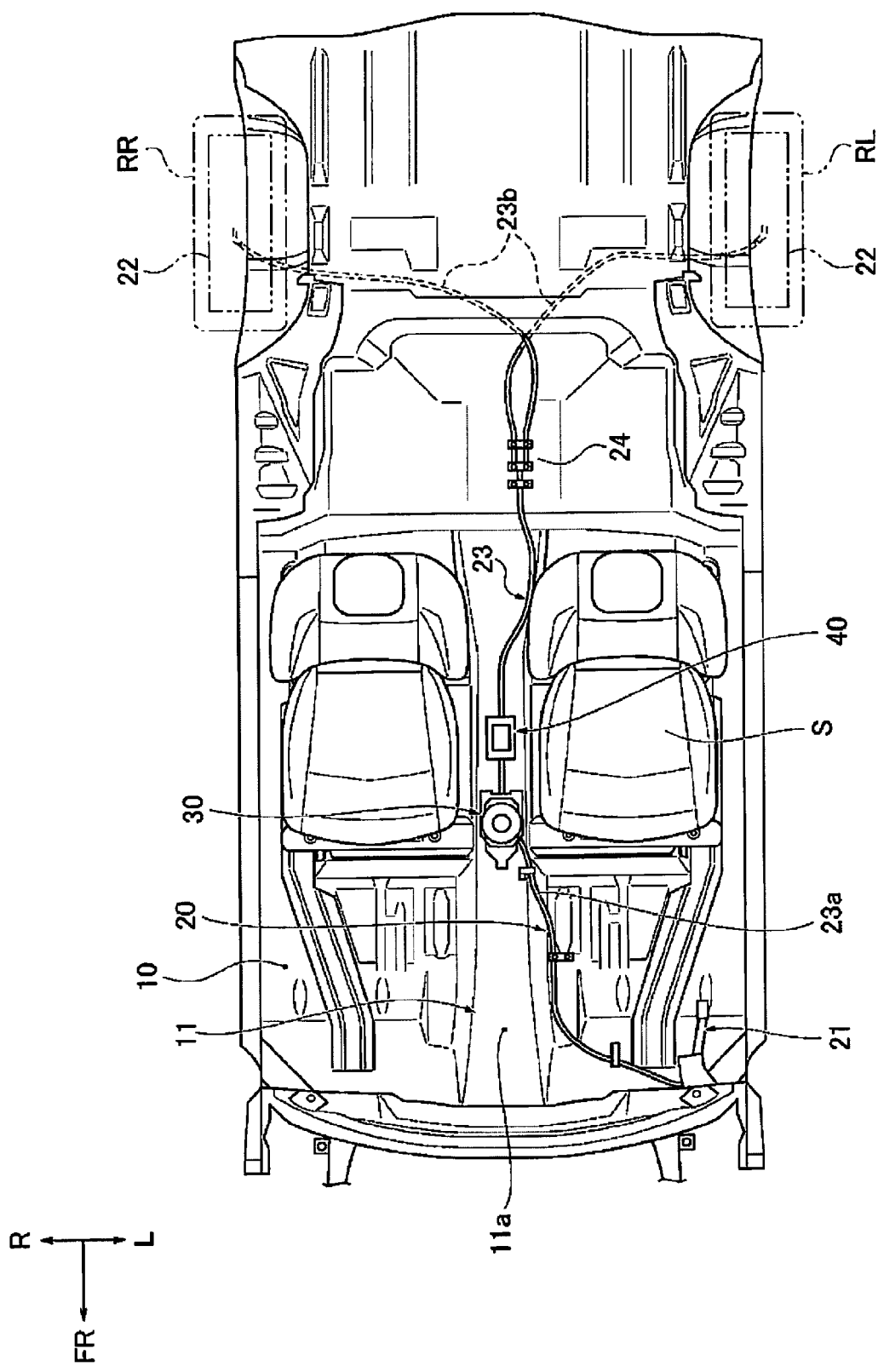
FIG. 2B is a schematic overall plan view showing the electric automobile of Embodiment 1.

FIG. 2A is a schematic overall side view showing the electric automobile of Embodiment 1. FIG. 2B is a schematic overall plan view showing the electric automobile of Embodiment 1. In the drawings, the letters FR indicate forward in the vehicle, the letters UP indicate upward in the vehicle, the letter R indicates the right side in the vehicle, and the letter L indicates the left side in the vehicle. The equipped configuration of the electric automobile of Embodiment 1 is described below with reference to FIGS. 2A and 2B.

The electric automobile 1 of Embodiment 1 is equipped with a parking brake mechanism 20 for immobilizing left and right rear wheels RL, RR (see FIG. 2B), a shift selection mechanism 30 for selectively controlling the driving range position of an automatic transmission (not shown), and an airbag sensor mechanism 40 for sensing impact incurred by the vehicle, as shown in FIGS. 2A and 2B. The floor panel 10 of Embodiment 1 has a longitudinally extending floor tunnel 11 formed by causing the vehicle-widthwise middle to bulge upward in the vehicle.

The parking brake mechanism 20 comprises a foot-operated operation pedal 21 disposed in a position forward of a seat S in the vehicle, a pair of parking brake units 22, 22 (referred to below as "brake units") disposed respectively on the inner sides of the left and right rear wheels RL, RR disposed farther rearward in the vehicle than the seat S, and a parking brake cable 23 (referred to below as a "brake cable") wired from the operation pedal 21 toward the rear of the vehicle and linking the pair of brake units 22, 22. The "seat S" is a driver seat where the driver sits.

The shift selection mechanism 30 is installed on an upward-facing top surface 11a of the floor tunnel 11. At this time, the shift selection mechanism 30 is installed in a position to the side of the seat S.

The airbag sensor mechanism 40 is installed on the top surface 11a of the floor tunnel 11. At this time, the airbag sensor mechanism 40 is installed in a position farther rearward in the vehicle than the shift selection mechanism 30.

Configuration of Parking Brake Mechanism

Figure 3:
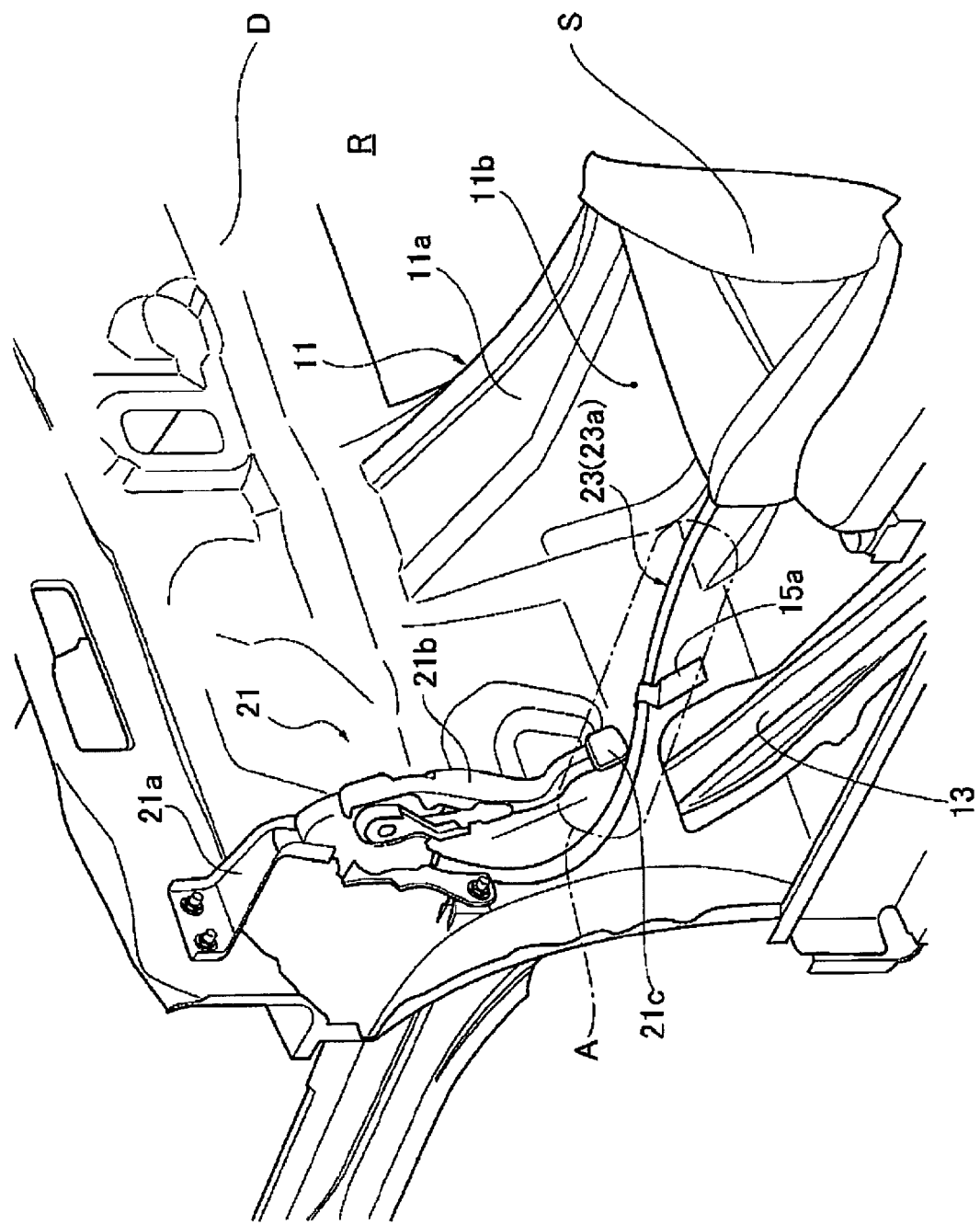
FIG. 3 is a perspective view showing operation pedal of Embodiment 1.

FIG. 3 is a perspective view showing the operation pedal of Embodiment 1. The configuration of the parking brake mechanism of Embodiment 1 is described below with reference to FIGS. 2A, 2B, and 3.

The parking brake mechanism 20 has the operation pedal 21, the pair of brake units 22, 22, and the brake cable 23, as described above.

The operation pedal 21 pulls the brake cable 23 due to being pressed by the driver. The operation pedal 21 has a bracket 21a and a pedal arm 21b as shown in FIG. 3.

The bracket 21a is secured in front of the seat S installed in the passenger compartment space R, in proximity to the left end section of the dash panel D herein, and the bracket protrudes into the passenger compartment space R. The electric automobile 1 of Embodiment 1 is a left-side-steered vehicle, in which the steering wheel (not shown) is set in the left side of the vehicle.

The pedal arm 21b is pivotably attached to the bracket 21a, and one end of the brake cable 23 is secured to the pedal arm. A pedal pad 21c is provided to the bottom end of the pedal arm 21b. Pressing the pedal pad 21c causes the pedal arm 21b to pivot, pulling the brake cable 23. A ratchet mechanism (not shown) is disposed on the pedal arm 21b, and the pedal arm 21*b* is held at a pressed angle. The ratchet mechanism can be released by pressing the pedal arm 21*b* again.

The pair of brake units 22, 22 are driven to immobilize the left and right rear wheels RL, RR due to the brake cable 23 being pulled.

The brake cable 23 is composed of a flexible steel wire cable, and an equalizer 24 (see FIG. 2B) is provided to the middle thereof. The brake cable 23 is branched from the middle into two stages by the equalizer 24. Specifically, the range from the operation pedal 21 to the equalizer 24 is a front cable 23*a*, and the range from the equalizer 24 to the brake units 22, 22 is divided into two rear cables 23*b*, 23*b*.

The front cable 23*a* and the equalizer 24 are wired to the top surface of the floor panel 10 that faces into the passenger compartment space R, and the rear cables 23*b* midway are drawn through the floor panel 10 out to the underfloor space Y, as shown in FIG. 2A.

Configuration of Shift Selection Mechanism

Figure 4A:
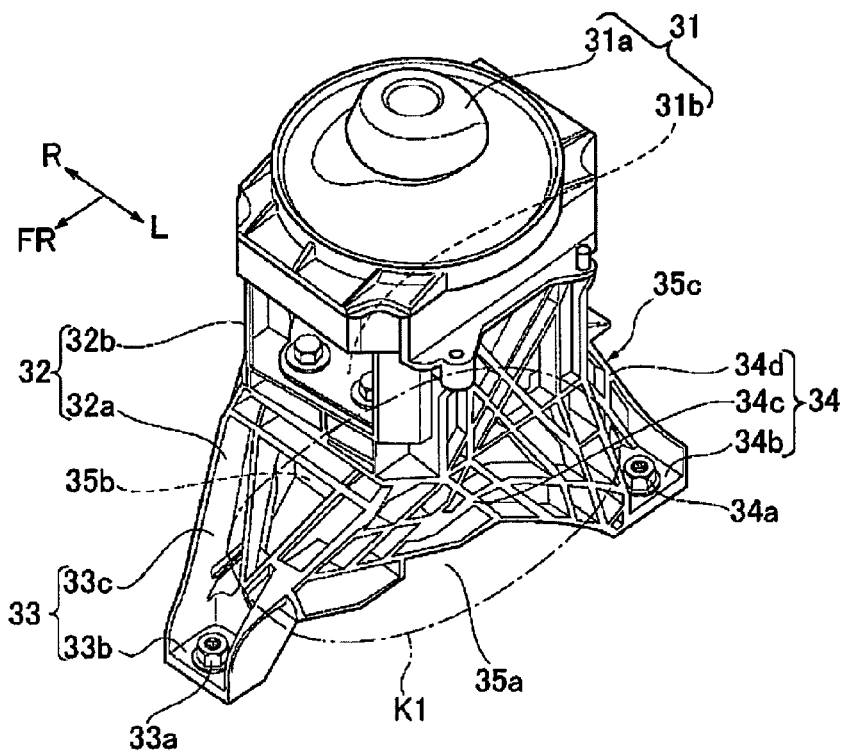
FIG. 4A is an external perspective view of a single unit of the shift selection mechanism of Embodiment 1.
Figure 4B:
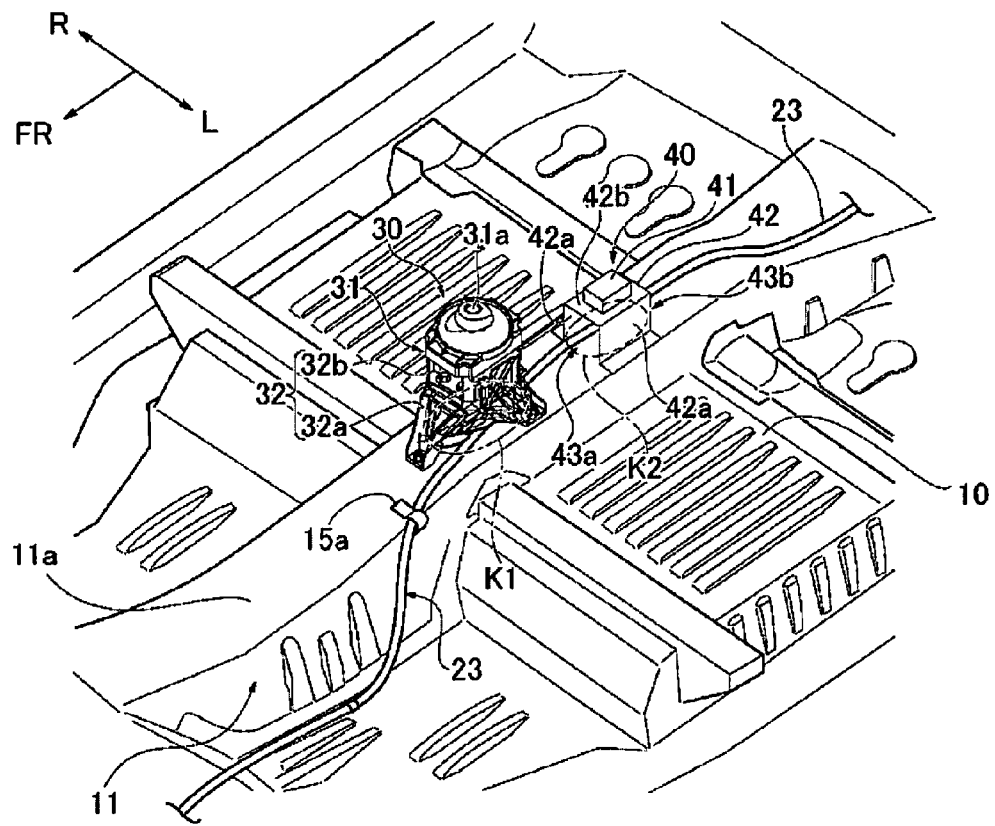
FIG. 4B is an external perspective view of the attached state of the shift selection mechanism of Embodiment 1.

FIG. 4A is an external perspective view of a single unit of the shift selection mechanism of Embodiment 1, and FIG. 4B is an external perspective view of the attached state of the shift selection mechanism of Embodiment 1. In the drawings, the letters FR indicate forward in the vehicle, the letter R indicates the right side in the vehicle, and the letter L indicates the left side in the vehicle. The configuration of the shift selection mechanism of Embodiment 1 is described below with reference to FIGS. 4A and 4B.

The shift selection mechanism 30 has a shift selection device 31 and a support bracket (device support structure) 32, as shown in FIG. 4A.

The shift selection device 31 has an operation switch 31*a* and a control circuit 31*b*, as shown in FIG. 4A. Tilting the operation switch 31*a* causes the shift selection device 31 to output a signal for shifting the driving range position from the control circuit 31*b* to the automatic transmission. In other words, the shift selection device 31 is the operating portion of a shift-by-wire structure.

The support bracket 32 supports the shift selection device 31 so as to allow a cable insertion space K1 between the shift selection device and the top surface 11*a* of the floor tunnel 11. The support bracket 32 has a support leg 32*a* standing upright from the floor tunnel 11, and a pedestal part 32*b* supported on the top end of the support leg 32*a*, the shift selection device 31 being attached to the pedestal part. The support bracket 32 herein is made of a resin, and is formed separate from the shift selection device 31.

Figure 5A:
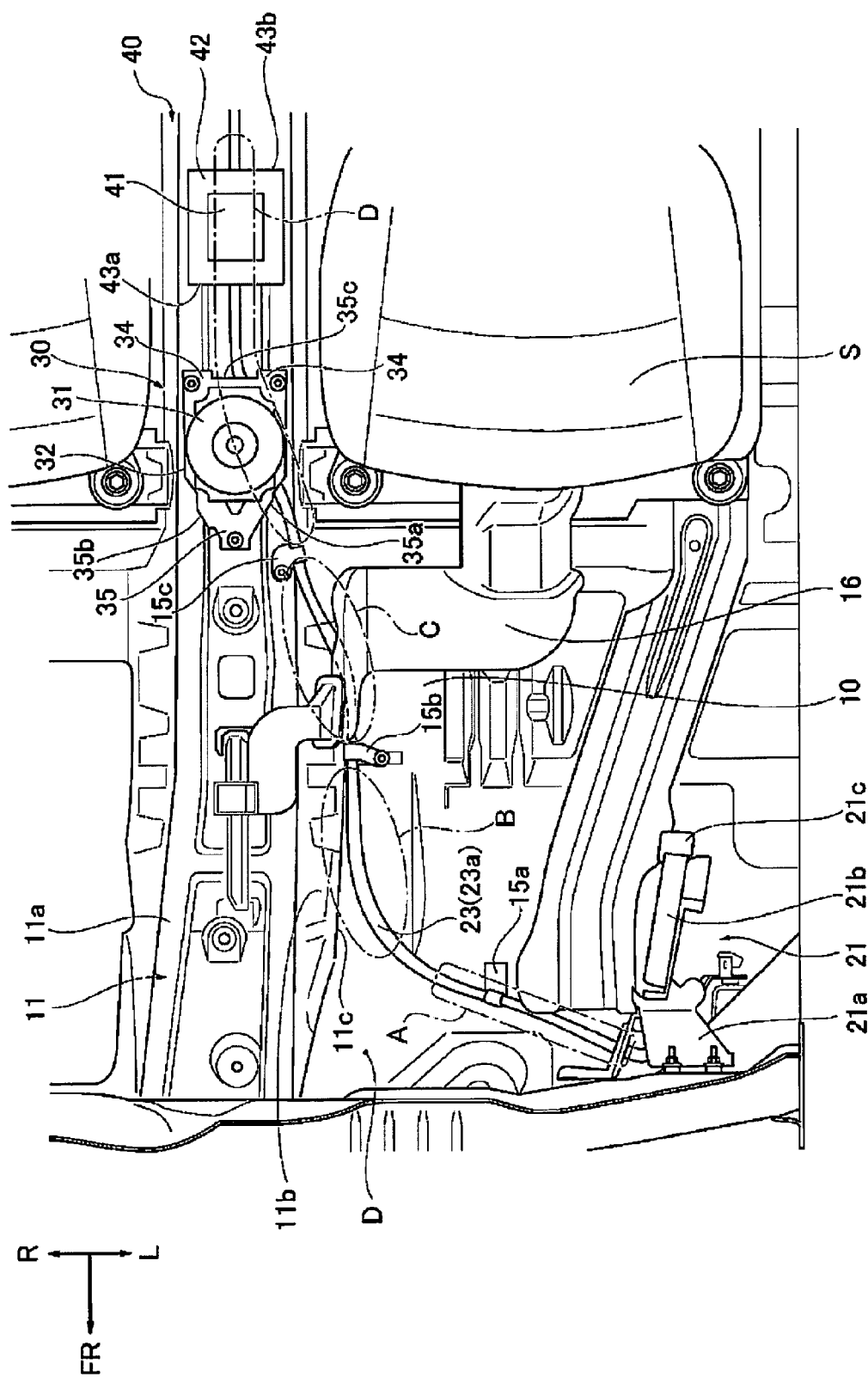
FIG. 5A is a partial plan view showing the electric automobile of Embodiment 1.

The support leg 32*a* is a three-legged structure having a front leg part 33 secured to the vehicle-widthwise middle of the top surface 11*a* of the floor tunnel 11, and a pair of rear leg parts 34, 34 secured in parallel in the vehicle width direction at a position rearward in the vehicle relative to the front leg part 33 (see FIG. 5A).

The front leg part 33 has a base plate 33*b* in which a bolt through-hole 33*a* is formed in the bottom end, and a leg part 33*c* that branches in two to the left and right as it rises upward from the base plate 33*b*, and that is linked to the pedestal part 32*b*.

Each of the rear leg parts 34 has a base plate 34*b* in which a bolt through-hole 34*a* is formed in the bottom end, an arm part 34*c* that extends forward in the vehicle in an arch from the base plate 34*b* and links to the front leg part 33, and a leg part 34*d* that extends upward from the base plate 34*b* and links to the pedestal part 32*b*.

The pedestal part 32*b* is a hollow frame member that is opened in the vehicle longitudinal direction, in which the control circuit 31*b* of the shift selection device 31 is disposed on the inner side, and the operation switch 31*a* of the shift selection device 31 is attached to the top side.

The support bracket 32 encloses the cable insertion space K1 with the support leg 32*a* and the pedestal part 32*b*. At this time, the cable insertion space K1 has a left-side open part 35*a* enclosed by the front leg part 33 and the arm part 34*c* of one rear leg part 34 and opening to the left side of the vehicle, a right-side open part 35*b* enclosed by the front leg part 33 and the arm part 34*c* of the other rear leg part 34 and opening to the right side of the vehicle, and a rear-side open part 35*c* enclosed by the pedestal part 32*b* and the leg parts 33*c* of the pair of left and right rear leg parts 34, 34 and opening to the rear of the vehicle.

Configuration of Airbag Sensor Mechanism

The airbag sensor mechanism 40 has an airbag sensor (sensor device) 41 and a sensor support bracket (sensor support structure) 42, as shown in FIG. 4B.

The airbag sensor 41, an "acceleration sensor," detects collisions incurred by the electric automobile 1. When the airbag sensor 41 detects a collision equal to or greater than a setting, an airbag ECU (not shown) deploys an airbag unit.

The sensor support bracket 42 supports the airbag sensor 41 so as to allow a second cable insertion space K2 between the airbag sensor and the top surface 11*a* of the floor tunnel 11. The sensor support bracket 42 has a pair of support legs 42*a*, 42*a* standing upright from the floor tunnel 11, and a pedestal part 42*b* supported on the top ends of the pair of support legs 42*a* and carrying the airbag sensor 41 in a secured manner.

The pair of support legs 42*a*, 42*a* extends in the vehicle width direction and encloses both sides of the second cable insertion space K2.

The pedestal part 42*b* covers the top side of the second cable insertion space K2, and the airbag sensor 41 is secured to the top surface.

The sensor support bracket 42 encloses the second cable insertion space K2 with the pair of support legs 42*a*, 42*a* and the pedestal part 42*b*. At this time, the second cable insertion space K2 has a front open part 43*a* opening toward the front of the vehicle and a rear open part 43*b* opening toward the rear of the vehicle.

Wired Configuration of the Brake Cable

Figure 5B:
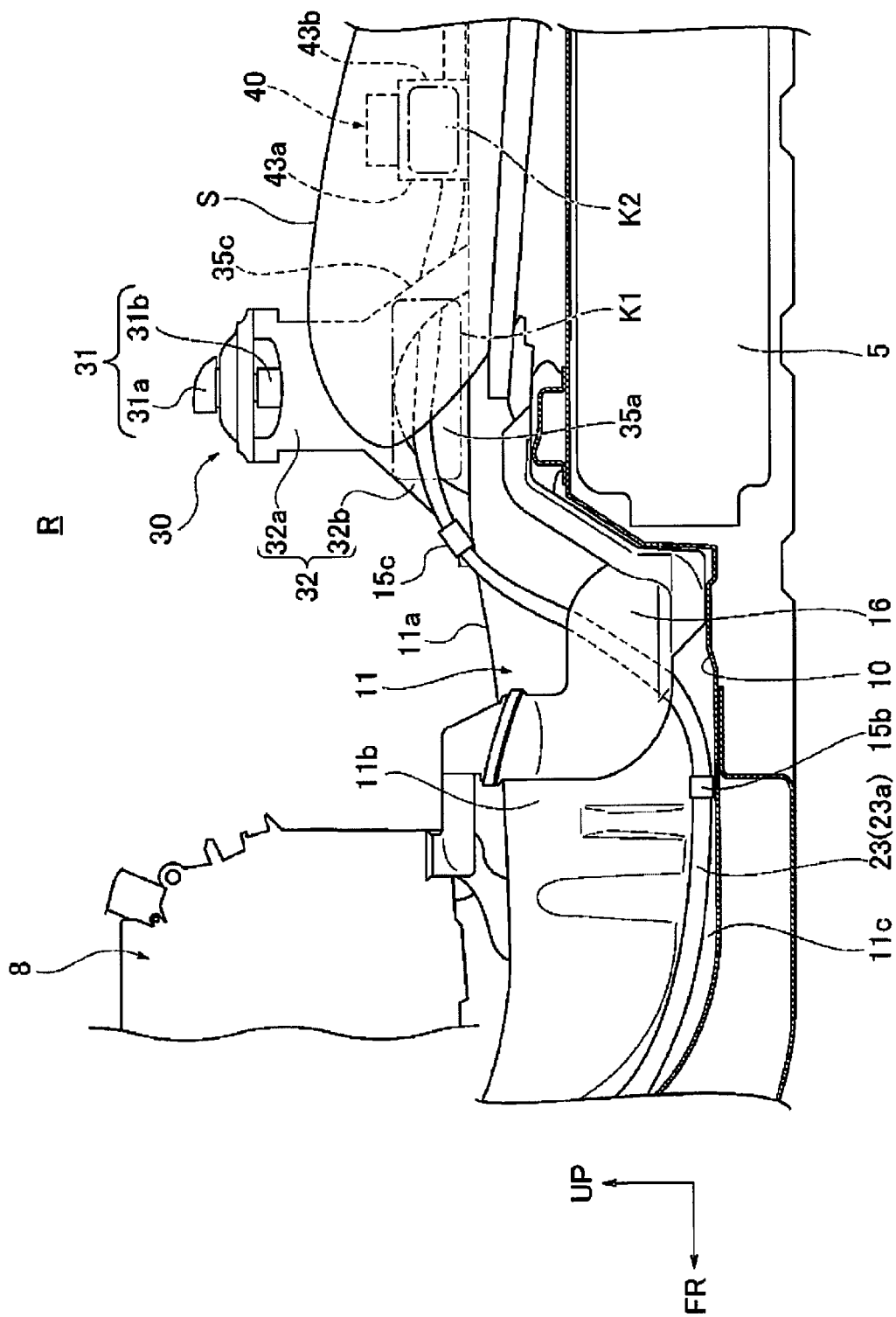
FIG. 5B is a partial side view showing the electric automobile of Embodiment 1.

FIG. 5A is a partial plan view showing the electric automobile of Embodiment 1. FIG. 5B is a partial side view showing the electric automobile of Embodiment 1. In the drawings, the letters FR indicate to the front of the vehicle, the letters UP indicate upward in the vehicle, the letter R indicates the right side in the vehicle, and the letter L indicates the left side in the vehicle. The wired configuration of the brake cable of Embodiment 1 is described below with reference to FIGS. 2B, 3, 5A, and 5B.

In the parking brake mechanism 20 of Embodiment 1, the operation pedal 21 is provided in a position in front of the seat S in the vehicle, and the pair of brake units 22, 22 are disposed respectively on the inner sides of the left and right rear wheels RL, RR, which are rearward in the vehicle from the seat S, as shown in FIG. 2B.

The floor tunnel 11 extending in the vehicle longitudinal direction and bulging upward in the vehicle at the vehicle-widthwise middle is formed in the floor panel 10 as shown in FIG. 2B. The shift selection mechanism 30 having the shift selection device 31 and the airbag sensor mechanism 40 having the airbag sensor 41 are disposed on the top surface 11*a* of the floor tunnel 11, in the order listed from the front of the vehicle. At this time, the shift selection mechanism 30 is installed in a position to the side of the seat S.

The brake cable 23, which links the operation pedal 21 of the parking brake mechanism 20 and the pair of brake units 22, 22, is connected to the operation pedal 21 at one end, and is extended downward in the vehicle from the operation pedal 21 along the dash panel D as shown in FIG. 3 (section A in FIGS. 3 and 5A). A side member 13 extending in the vehicle longitudinal direction is set below the position where the operation pedal 21 is attached.

Therefore, the brake cable 23 is wired so as to gradually approach the floor tunnel 11 in the vehicle-widthwise middle while progressing downward in the vehicle. A medial position of the brake cable 23 is secured to the dash panel D by a first clip 15a.

The brake cable 23, which extends up to a bottom end part 11c of a side surface 11b of the floor tunnel 11 at the border of the floor tunnel 11 and the floor panel 10, is wired toward the rear of the vehicle along the bottom end part 11c of the floor tunnel 11 (section B in FIG. 5A).

In a position in front of the driver seat S, the support bracket 32 gradually creeps upward in the vehicle over the side surface 11b of the floor tunnel 11 while progressing rearward in the vehicle (section C in FIG. 5A). The medial position of the brake cable 23 is secured by a second clip 15b to the floor panel 10 in proximity to the bottom end part 11c of the floor tunnel 11.

An air-conditioning duct 16 for guiding conditioned air from the air-conditioning unit 8 to the bottom side of the seat S is provided to the electric automobile 1 of Embodiment 1, and a medial position of the air-conditioning duct 16 has a flat shape running along the side surface 11b of the floor tunnel 11. The brake cable 23 passes through a gap space formed between the flat portion of the air-conditioning duct 16 and the side surface 11b of the floor tunnel 11.

Having crept up the side surface 11b of the floor tunnel 11, the brake cable 23 is secured by a third clip 15c to the top surface 11a of the floor tunnel 11, and is then wired toward the rear of the vehicle along the top surface 11a of the floor tunnel 11.

At this time, the shift selection mechanism 30 and the airbag sensor mechanism 40 are provided to the top surface 11a of the floor tunnel 11, but the brake cable 23 is wired sequentially through the cable insertion space K1 and the second cable insertion space K2 (section D in FIG. 5A).

Specifically, the brake cable 23 is wired from the left-side open part 35a toward the rear-side open part 35c in the cable insertion space K1, as shown in FIG. 5B. In the second cable insertion space K2, the brake cable is wired from the front open part 43a toward the rear open part 43b.

The equalizer 24 is provided to the brake cable 23 which has passed through the second cable insertion space K2, and after branching into the two rear cables 23b, the brake cable 23 is drawn through the floor panel 10 out to the underfloor space Y (see FIG. 2B).

Next, the action will be described.

There shall first be described "Problems when wiring the brake cable," and subsequently the action of wiring the brake cable in the wiring structure of a parking brake cable of Embodiment 1.

Problems when Wiring Brake Cable

In Embodiment 1, the foot-operated operation pedal 21 of the parking brake mechanism 20 is disposed in front of the seat S. Therefore, when the brake cable 23 is wired from the operation pedal 21 toward the rear of the vehicle, the brake cable must avoid interfering with the seat S.

The air-conditioning duct 16 for guiding conditioned air from the air-conditioning unit 8 is installed between the bottom surface of the seat S and the floor panel 10, as shown in FIG. 5B. Therefore, the brake cable 23 cannot be wired between the seat S and the floor panel 10.

The seat S is located in proximity to the side surface 11b of the floor tunnel 11 formed in the vehicle-widthwise middle of the floor panel 10, as shown in FIG. 5A. Therefore, the brake cable 23 cannot be wired between the seat S and the side surface 11b of the floor tunnel 11.

Thus, to wire the brake cable 23 from the operation pedal 21 toward the rear of the vehicle while avoiding interference with the seat S, the brake cable 23 must creep up the side surface 11b of the floor tunnel 11 at a position in front of the seat S, and must be wired along the top surface 11a.

In cases in which a gap large enough to wire the brake cable 23 through is provided between the seat S and the side surface 11b of the floor tunnel 11, the brake cable 23 must be wired on the top surface 11a of the floor tunnel 11. However, in such cases, the vehicle-widthwise dimension of the electric automobile 1 increases, which undesirable from the standpoint of making the vehicle more compact.

Moreover, the brake cable 23 is preferably wired straight in order to smoothly transmit the pulling force of the operation pedal 21 to the brake units 22. In other words, when the brake cable 23 is bent, the bend R must be increased as much as possible. Therefore, the brake cable 23 must be wired so as to be as far as possible from the operation pedal 21 and so as to creep up the side surface 11b of the floor tunnel 11 at a position near the seat S.

Furthermore, aside from the operation pedal 21 of the parking brake mechanism 20, also installed in a position forward of the seat S in the vehicle are a brake pedal and an acceleration pedal (not shown). Therefore, when the brake cable 23 is wired, the brake cable must avoid interfering with these pedals as well.

The shift selection mechanism 30 is disposed on the top surface 11a of the floor tunnel 11 in a position to the side of the seat S, and the airbag sensor mechanism 40 is disposed rearward of the shift selection mechanism 30 in the vehicle. Therefore, when the brake cable 23 is wired, the brake cable must avoid interfering with these mechanisms 30, 40 as well.

Action of Wiring the Brake Cable

In the parking brake wiring structure of Embodiment 1, the brake cable 23 extending from the operation pedal 21 provided in front of the seat S is wired downward along the dash panel D and gradually toward the floor tunnel 11 in the vehicle-widthwise middle. Interference between the brake cable 23 and the side member 13 set below the attached position of the operation pedal 21 can thereby be avoided.

The brake cable 23 is then wired toward the rear of the vehicle along the bottom end part 11c of the side surface 11b of the floor tunnel 11, which is in the border between the floor tunnel 11 and the floor panel 10. The brake cable then creeps up the side surface 11b of the floor tunnel 11, gradually rising upward in the vehicle as it progresses toward the rear of the vehicle in a position in front of the seat S.

Therefore, brake cable 23 can be wired to a position as far as possible from the brake pedal and the accelerator pedal while preventing the bend R in the brake cable 23 from becoming smaller. It is thereby possible to guarantee a larger pedal operation space needed to operate the driver pedals provided in front of the seat S.

The bottom end part 11c of the side surface 11b of the floor tunnel 11 also has a corner shape, formed from the floor panel 10 which is a horizontal surface, and the floor tunnel 11 standing upright from the floor panel 10. In other words, the side surface 11b of the floor tunnel 11 is an obstacle that hinders the driver's foot from entering the corner-shaped portion formed in the bottom end part 11c of the floor tunnel 11. Therefore, wiring the brake cable 23 along the corner-shaped bottom end part 11c of the floor tunnel 11 can make it difficult for the driver's foot to come in contact with the brake cable 23.

Furthermore, in the shift selection mechanism 30 in the parking brake wiring structure of Embodiment 1, the shift selection device 31 is supported by the support bracket 32 so as to allow the cable insertion space K1 between the shift selection device and the top surface 11a of the floor tunnel 11. In the airbag sensor mechanism 40, the airbag sensor 41 is supported by the sensor support bracket 42 so as to allow the second cable insertion space K2 to be provided between the airbag sensor and the top surface 11a of the floor tunnel 11.

Therefore, the brake cable 23, which creeps up the side surface 11b of the floor tunnel 11 and reaches the top surface 11a of the floor tunnel 11, is wired so as to pass through the cable insertion space K1, and is also wired so as to pass through the second cable insertion space K2.

In other words, when the brake cable 23 is wired over the top surface 11a of the floor tunnel 11 toward the rear of the vehicle, the brake cable passes sequentially under the shift selection device 31 and under the airbag sensor 41.

It is thereby possible to prevent interference between the brake cable 23 wired over the floor tunnel 11 from the front side of the seat S toward the rear of the vehicle, and the shift selection device 31 set in a position to the side of the seat S on the floor tunnel 11.

It is also possible to prevent interference between the brake cable 23 wired over the floor tunnel 11 from the front side of the seat S toward the rear of the vehicle, and the airbag sensor 41 on the floor tunnel 11.

Particularly, in Embodiment 1, the cable insertion space K1 comprises the left-side open part 35a opening to the left side of the vehicle and the right-side open part 35b opening to the right side of the vehicle. Therefore, the brake cable can be smoothly wired within the cable insertion space K1 without making the bend R in the brake cable 23 any smaller, whether the operation pedal 21 of the parking brake mechanism 20 is set to the left or right in the vehicle from the floor tunnel 11 formed in the vehicle-widthwise middle.

In other words, in Embodiment 1, the operation pedal 21 is disposed in proximity to the left-side end of the dash panel D, and the brake cable 23 is wired toward the floor tunnel 11 from the left side of the floor tunnel 11. The brake cable is then inserted into the cable insertion space K1 from the left-side open part 35a opening to the left side of the vehicle.

In a right-steered vehicle in which the steering wheel is set on the right side of the vehicle, the operation pedal 21 is provided to the right in the vehicle from the floor tunnel 11. In this case, the brake cable 23 is wired toward the floor tunnel 11 from the right side of the floor tunnel 11. The brake cable is then inserted into the cable insertion space K1 from the right-side open part 35b opening to the right side of the vehicle.

Thus, the brake cable 23 can be wired smoothly whether the operation pedal 21 is on the right side or left side in the vehicle from the floor tunnel 11.

In the wiring structure of a parking brake cable of Embodiment 1, the support bracket 32 has the support leg 32a standing upright from the floor tunnel 11 and the pedestal part 32b supported on the support leg 32a. Therefore, the shift selection device 31 is stably supported, and even in cases such as when vibration occurs in the electric automobile 1, the brake cable 23 is prevented from coming in contact with the shift selection device 31.

Furthermore, because the support leg 32a of the support bracket 32 is a three-legged structure having the single front leg part 33 and the pair of rear leg parts 34, 34 in parallel in the vehicle width direction, the support bracket 32 can be installed in a more compact space than in cases such as when there are four support legs. As a result, the brake cable 23 can be impeded from coming in contact with the support bracket 32.

Next, the effects will be described.

In the wiring structure of a parking brake cable of Embodiment 1, the effects listed below can be achieved.

(1) The wiring structure of a parking brake cable is configured comprising:

a parking brake cable 23 linking a foot-operated operation pedal 21 provided in front of a driver seat (a seat) S and parking brake units 22 provided to vehicle wheels (rear wheels) RL, RR rearward of the driver seat S;

a shift selection device 31 operated by the driver to output a signal for switching a driving range position; and device support structure (a support bracket) 32 for supporting the shift selection device 31 in a position to the side of the driver seat S so as to allow a cable insertion space K1 between the shift selection device and a top surface 11a of a floor tunnel 11; wherein the parking brake cable 23 is directed toward the top surface 11a of the floor tunnel 11 on the front side in the vehicle from the driver seat S, and is wired so as to pass through the cable insertion space K1.

It is thereby possible to prevent interference between the parking brake cable 23 wired over the floor tunnel 11 from the front side of the driver seat S toward the rear of the vehicle, and the shift selection device 31 set in a position to the side of the seat on the floor tunnel 11.

(2) The wiring structure of a parking brake cable is configured such that the cable insertion space K1 has a left-side open part 35a opening to the left side of the vehicle, a right-side open part 35b opening to the right side of the vehicle, and a rear-side open part 35c opening to the rear of the vehicle.

The brake cable can thereby be smoothly wired within the cable insertion space K1 without making the bend R in the parking brake cable 23 any smaller, whether the operation pedal 21 is set to the left or right in the vehicle from the floor tunnel 11.

(3) The wiring structure of a parking brake cable is configured such that device support structure (the support bracket) 32 has a support leg 32a standing upright from the top surface 11a of the floor tunnel 11, and a pedestal part 32b supported on the support leg 32a, the shift selection device 31 being attached to the pedestal part.

The shift selection device 31 can thereby be stably supported, and the parking brake cable 23 can be prevented from coming in contact with the shift selection device 31 in instances such as when the vehicle vibrates.

(4) The wiring structure of a parking brake cable is configured such that the support leg 32a has a three-legged structure comprising a single front leg part 33, and a pair of rear leg parts 34, 34 aligned in the vehicle width direction and disposed in a position rearward in the vehicle relative to the front leg part 33.

The device support structure (the support bracket) 32 can thereby be installed in a more compact space.

(5) The wiring structure of a parking brake cable is configured such that: the floor tunnel 11 is formed by causing the floor panel 10 to bulge upward in the vehicle; and the parking brake cable 23 is wired toward the rear of the vehicle along a border position (the bottom end part) 11c between the floor panel 10 and the floor tunnel 11.

It is thereby possible to impede the driver's foot from coming in contact with the parking brake cable 23 when the electric automobile 1 is being driven.

(6) The wiring structure of a parking brake cable is configured such that: sensor support structure (the sensor support bracket) 42 is disposed so as to support a sensor device (the airbag sensor) 41 installed in the vehicle at a position rearward in the vehicle from the shift selection device 31, so as to allow a second cable insertion space K2 between the sensor device and the floor tunnel 11; and the parking brake cable 23 passed through the cable insertion space K1 is wired so as to pass through the second cable insertion space K2.

The parking brake cable 23 can thereby be wired in the vehicle-widthwise middle with minimal bending, even in cases when the sensor device (the airbag sensor) 41 is provided to the rear side in the vehicle of the shift selection device 31.

The wiring structure of a parking brake cable of the present invention was described above on the basis of Embodiment 1, but the specific configuration is not limited to this embodiment; alterations, additions, etc. may be made to the design as long as they do not depart from the scope of the invention according to the claims.

In Embodiment 1, an example was given in which the operation pedal 21 of the parking brake mechanism 20 was provided to the left side of the floor tunnel 11 in the vehicle, but the invention is not limited to this example. The operation pedal 21 may also be provided to the right side of the floor tunnel 11 in the vehicle.

In the shift selection mechanism 30 of Embodiment 1, an example was given in which the support bracket 32 had a three-legged structure having the single front leg part 33 and the pair of rear leg parts 34, 34 in parallel in the vehicle width direction. However, this example is not provided by way of limitation to the invention; the support bracket may be structured having four leg parts having a pair of front leg parts, or having even more leg parts than this. Furthermore, because the support bracket 32 preferably has an open part opening in the direction in which the operation pedal 21 of the parking brake mechanism 20 is provided, the support bracket may have only the left-side open part 35a or only the right-side open part 35b, or the support bracket may have only an open part opening to the front of the vehicle.

In Embodiment 1, an example was given in which the support bracket 32 was formed separate from the shift selection device 31, but the support bracket may be formed integrally with the shift selection device 31. Specifically, the device support structure preferably supports the shift selection device 31 so as to allow the cable insertion space between the shift selection device and the top surface 11a of the floor tunnel 11.

In Embodiment 1, the sensor device installed in the vehicle is the airbag sensor 41 of the airbag sensor mechanism 40, but is not limited thereto. The sensor device may be, for example, an ABS sensor, a yaw rate sensor, a transverse gravity sensor, a longitudinal gravity sensor, or the like.

In Embodiment 1, an example was given in which the wiring structure of a parking brake cable was applied to the electric automobile 1, but the structure is not limited thereto. The structure can also be applied to an engine automobile, a hybrid automobile, a fuel cell vehicle, or the like. In other words, the structure can be applied if the vehicle is provided with a foot-operated operation pedal, a brake cable wired from the front of the vehicle towards the rear, and a shift selection device.

The invention claimed is:

1. A parking brake cable wiring structure comprising:
   a parking brake cable configured to extend rearward in a vehicle from a foot-operated operation pedal disposed in front of a driver seat, and configured to link to parking brake units provided to vehicle wheels rearward of the driver seat;
   a shift selection device configured to be operated by the driver to output a signal for switching a driving range position; and
   a device support structure configured to support the shift selection device in a position to the side of the driver seat so as to enable a cable insertion space to be disposed between the shift selection device and a top surface of a floor tunnel,
   the parking brake cable being configured so as to be directed toward the top surface of the floor tunnel on the front side in the vehicle from the driver seat and to pass through the cable insertion space,
   the top surface of the floor tunnel being spaced apart from a floor panel of the vehicle.

2. The parking brake cable wiring structure according to claim 1, wherein
   the device support structure is configured to support the shift selection device in the position to the side of the driver seat so as to enable the cable insertion space to have a left-side open part opening to the left side of the vehicle, a right-side open part opening to the right side of the vehicle, and a rear-side open part opening to the rear of the vehicle.

3. The parking brake cable wiring structure according to claim 1, wherein
   the device support structure has a support leg configured to stand upright from the top surface of the floor tunnel, and a pedestal part supported on the support leg, the shift selection device being attached to the pedestal part.

4. The parking brake cable wiring structure according to claim 3, wherein
   the support leg has a three-legged structure comprising a single front leg part, and a pair of rear leg parts aligned in the vehicle width direction and disposed in a position rearward in the vehicle relative to the front leg part.

5. The parking brake cable wiring structure according to claim 1, wherein
   the parking brake cable is configured to be directed toward the rear of the vehicle along a border position between the floor panel and the floor tunnel, the floor tunnel being formed by causing the floor panel to bulge upward in the vehicle.

6. The parking brake cable wiring structure according to claim 1, further comprising
   a sensor support structure configured to support a sensor device disposed in the vehicle at a position rearward in the vehicle from the shift selection device, so as to enable a second cable insertion space to be disposed between the sensor device and the floor tunnel and
   the parking brake cable being configured to be passed through the cable insertion space and to pass through the second cable insertion space.

7. The parking brake cable wiring structure according to claim 2, wherein
the device support structure has a support leg configured to stand upright from the top surface of the floor tunnel, and a pedestal part supported on the support leg, the shift selection device being attached to the pedestal part.

8. The parking brake cable wiring structure according to claim 2, wherein
the parking brake cable is configured to be directed toward the rear of the vehicle along a border position between the floor panel and the floor tunnel, the floor tunnel being formed by causing the floor panel to bulge upward in the vehicle.

9. The parking brake cable wiring structure according to claim 3, wherein
the parking brake cable is configured to be directed toward the rear of the vehicle along a border position between the floor panel and the floor tunnel, the floor tunnel being formed by causing the floor panel to bulge upward in the vehicle.

10. The parking brake cable wiring structure according to claim 4, wherein
the parking brake cable is configured to be directed toward the rear of the vehicle along a border position between the floor panel and the floor tunnel, the floor tunnel being formed by causing the floor panel to bulge upward in the vehicle.

11. The parking brake cable wiring structure according to claim 2, further comprising
a sensor support structure configured to support a sensor device installed in the vehicle at a position rearward in the vehicle from the shift selection device, so as to enable a second cable insertion space to be disposed between the sensor device and the floor tunnel and
the parking brake cable being configured to be passed through the cable insertion space and to pass through the second cable insertion space.

12. The parking brake cable wiring structure according to claim 3, further comprising
a sensor support structure configured to support a sensor device installed in the vehicle at a position rearward in the vehicle from the shift selection device, so as to enable a second cable insertion space to be disposed between the sensor device and the floor tunnel and
the parking brake cable being configured to be passed through the cable insertion space and to pass through the second cable insertion space.

13. The parking brake cable wiring structure according to claim 4, further comprising
a sensor support structure configured to support a sensor device installed in the vehicle at a position rearward in the vehicle from the shift selection device, so as to enable a second cable insertion space to be disposed between the sensor device and the floor tunnel and
the parking brake cable being configured to be passed through the cable insertion space and to pass through the second cable insertion space.

14. The parking brake cable wiring structure according to claim 5, further comprising
a sensor support structure configured to support a sensor device installed in the vehicle at a position rearward in the vehicle from the shift selection device, so as to enable a second cable insertion space to be disposed between the sensor device and the floor tunnel and
the parking brake cable being configured to be passed through the cable insertion space and to pass through the second cable insertion space.

15. The parking brake cable wiring structure according to claim 1, wherein
the floor tunnel is formed in the floor panel.

16. The parking brake cable wiring structure according to claim 1, wherein
the floor tunnel extends in a longitudinal direction of the vehicle and bulges upward in the vehicle at a vehicle-widthwise middle.

17. The parking brake cable wiring structure according to claim 1, wherein
the shift selection device is disposed on the top surface of the floor tunnel.

* * * * *